United States Patent [19]

Hasman

[11] 4,169,844

[45] * Oct. 2, 1979

[54] HYDROGENATION OF UNREFINED GLYCERIDE OILS

[75] Inventor: John M. Hasman, Chatham, N.J.

[73] Assignee: SCM Corporation, New York, N.Y.

[*] Notice: The portion of the term of this patent subsequent to Jun. 19, 1996, has been disclaimed.

[21] Appl. No.: 896,508

[22] Filed: Apr. 17, 1978

Related U.S. Application Data

[63] Continuation-in-part of Ser. No. 850,150, Nov. 10, 1977, which is a continuation-in-part of Ser. No. 733,348, Oct. 18, 1976, abandoned, said Ser. No. 850,160, is a continuation-in-part of Ser. No. 778,710, Mar. 17, 1977, abandoned.

[51] Int. Cl.[2] .......................... C11C 3/12; B01J 23/84

[52] U.S. Cl. .................................... 260/409; 252/468; 252/470; 252/473; 252/474

[58] Field of Search ........................................ 260/409

[56] References Cited

U.S. PATENT DOCUMENTS

| | | | |
|---|---|---|---|
| 2,307,065 | 1/1943 | Paterson | 260/409 |
| 2,357,352 | 9/1944 | Paterson | 260/409 |
| 2,413,009 | 12/1946 | Taussky | 260/409 |
| 3,856,710 | 12/1974 | Moulton et al. | 260/409 |

OTHER PUBLICATIONS

Popescu et al., "High Olcic Oils by Selective Hydrogenation of Soybean Oils", JAOCS 46, pp. 97–99.

*Primary Examiner*—John F. Niebling
*Attorney, Agent, or Firm*—Jerry K. Mueller, Jr.; Merton H. Douthitt; Robert A. Sturges

[57] ABSTRACT

Unrefined or crude glyceride oil is hydrogenated in rapid fashion in the presence of nickel hydrogenation catalyst and of copper chromite adjunct catalyst. In a preferred embodiment of the invention, a nickel-only secondary hydrogenation stage follows for making a stearine in extremely rapid fashion.

30 Claims, No Drawings

HYDROGENATION OF UNREFINED GLYCERIDE OILS

CROSS-REFERENCE TO RELATED APPLICATIONS

This is a continuation-in-part of application U.S. Ser. No. 850,150, filed Nov. 10, 1977, which is a continuation-in-part of application U.S. Ser. No. 733,348, filed Oct. 18, 1976, now abandoned; and is a continuation-in-part of application U.S. Ser. No. 850,160, filed Nov. 10, 1977, which is a continuation-in-part of application U.S. Ser. No. 778,710, filed Mar. 17, 1977, now abandoned.

BACKGROUND OF THE INVENTION

This invention relates to a process for catalytically hydrogenating raw or unrefined triglyceride oil and more particularly to hydrogenating in extremely rapid fashion such oil.

Hydrogenation of refined glyceride oils is widely practiced and much has been written on this operation. Little attention, however, has been focused on the hydrogenation of raw or crude oils evidently because the type and level of contaminants therein have made such hydrogenation appear impractical. The present invention provides a method for hydrogenation of raw oils in rapid fashion under conventional hydrogenation conditions.

SUMMARY OF THE INVENTION

Crude glyceride oil is catalytically hydrogenated with hydrogen gas in a hydrogenation zone under glyceride oil hydrogenation conditions to produce a hydrogenated oil product. The hydrogenation process proceeds substantially insensitively to the presence of contaminants in the oil in the presence of nickel hydrogenation catalyst and of copper-chromite adjunct catalyst. The nickel catalyst is in a concentration in excess of 0.02% by weight of the oil, and the adjunct catalyst is present in a proportion of at least about 0.2% by weight of the oil. The hydrogenation process is discontinued after at least a significant increase in saturation of the oil has occurred. In a preferred embodiment of the present invention, the oil is hydrogenated in the presence of the catalyst-adjunct catalyst system to an intermediate IV of at least 10% less than the IV of the oil fed to the hydrogenation process. Following this, the oil is subjected to a second hydrogenation step in the presence of only nickel catalyst for producing the hydrogenated stearine product in extremely rapid fashion.

DETAILED DESCRIPTION OF THE INVENTION

Raw or crude glyceride oils contain a variety of contaminants which display a depressant effect in a hydrogenation process by poisoning the hydrogenation catalyst, thus rendering it ineffective in the hydrogenation process. Typically, such contaminants amount to about 5% by weight or less of the unrefined oil, though this figure can vary substantially depending upon the particular type of oil and it source.

Typical contaminants found in raw oils include phosphatides usually in a proportion of about 0.1 to 3% by weight; sterols, which form the majority of the unsaponifiable content of the oil, usually in a proportion of about 0.1 to 1%, though some oils contain as much as about 7%; hydrocarbons, such as squalene, usually in a proportion of about 0.1 to 1.0%; sometimes fatty alcohols originating from seed coating wax left in the oil; color bodies such as cartenoids and the like; natural antioxidants such as tocopherols; metals and minerals such as, for example, copper (about 0.1 to 0.3 ppm), manganese (about 0.1 to 0.7 ppm), iron (about 1 to 5 ppm), and the like; free fatty acids, usually in a proportion of about 0.5 to 5% or more, and various other contaminants, e.g. gums, slimes, and other mucilaginous material. It should be understood that the foregoing information is exemplary, and many contaminants can vary in kind and amount depending upon the type of oil, source of the oil, efficiency of extracting the oil and several other considerations.

It is believed that the contaminants which exert the greatest depressant effect on the hydrogenation process are phosphatides, free fatty acids, and the minerals or metals found in the raw oil. For a more complete treatise on glyceride oils, see: *Bailey's Industrial Oil and Fat Products,* 3rd Edition, especially pages 1–53 (interscience Publishers, New York, N.Y. 1964), the disclosure of which is expressly incorporated herein by reference.

For present purposes, it is assumed that the level of phosphatides accurately serves as an indicator or yardstick by which the other contaminants in the oil can be measured. It also is believed that the phosphatides may exert the most significant single depressant effect on hydrogenation. Thus, adjustment of process parameters based on the level of phosphatides in the crude oil most often will permit useful practice of the present process.

Crude, raw, or unrefined oil, as such terms are used herein, comprehends a glyceride oil which has not been subjected to conventional refining techniques such as alkali refining or other techniques. It is, however, within the scope of this invention to include crude oils which have been subjected to a degumming operation for lowering the level of phosphatides and other gums, slimes or mucilaginous material, but where the acidity of the oil is not significantly reduced (see *Bailey's Industrial Oil and Fat Products,* pages 731–733 supra). Conventional degumming includes treatment of the crude oil with water, weak boric acid, sodium chloride, or a wide variety of other agents well-known in the art. Drying of the oil to remove water also is a contemplated desired operation. De-acidification of the crude oil may be practiced also, though the depressant effect which fatty acids display in the process is virtually completely suppressed by the present invention.

Broadly, a phosphatide level of not substantially above about 2% by weight is desired and most crude oils do not exceed this level of phosphatides. Advantageously, the level of phosphatides is less than about 1.5%, and preferably less than about 1% by weight of the crude oil. Lower phosphatide levels permit enhanced efficiency and speed in the present hydrogenation process, but one need not exert any special efforts to remove the phosphatides as conventional commercial de-gummed crude oils are quite useful in the present process. Usually, the proportion of phosphatides in the crude oil is greater than about 0.01% and more often greater than about 0.1% by weight. Commercial degummed crude oils usually contain from about 0.001 to 0.005% phosphatides. Adjustment of the copper-chromite adjunct catalyst broadly proportional to the level of contaminants in the oil (conveniently measured by the level of phosphatides in the oil) can effectively suppress the depressant effect which such contaminants have on the hydrogenation process, as the examples will demonstrate.

The initial IV of the feed oil depends upon the particular choice of oil and can range from as low as 10–25 to as high as 150–210 with many oils having an IV between such IV ranges. Primary hydrogenation in the presence of the catalyst/adjunct catalyst system proceeds at a substantially constant rate and fairly quickly. As used herein, primary hydrogenation means use of the catalyst/adjunct catalyst system for catalytically hydrogenating the glyceride oil, whether such system is used as the total process, or as a first stage followed by the nickel-only secondary stage.

Primary hydrogenation is continued until at least a significant increase in saturation of the oil has occurred. In the broadest aspect of the invention, using the catalyst/adjunct catalyst system for a one-stage hydrogenation process, a "significant increase in saturation of the oil" means that the final IV of the oil is less than about 100; between about 60 to 70, when a shortening-like consistency of the oil is desired; and less than 30 when a stearine product is desired. In a preferred embodiment of the present invention where a nickel-only secondary stage follows, a "significant increase in saturation of the oil" (from primary hydrogenation) means at least about a 10% reduction of the IV of the oil fed to the process. The final IV of the hydrogenated product withdrawn from the secondary zone is preferably less than about 30 for making a stearine.

Generally, the adjunct catalyst is present in the zone in an amount of at least about 0.2 weight-percent based on the weight of the oil in the zone for maintaining speed and efficiency of the process. The adjunct catalyst can be present up to about 3 weight-percent or higher depending upon the concentration of contaminants in the feed oil.

The nickel catalyst is present in the zone in an amount of greater than 0.02 weight-percent and this amount can range from about 0.025 to 0.3 weight-percent or higher. At these higher levels of nickel catalyst, the present process proceeds very rapidly regardless of the type of hydrogenated product being made. Consequently, the present hydrogenation process can produce a stearine product (IV not substantially above about 30) in astonishingly rapid fashion.

The present process also permits production of less hydrogenated products having an IV of not substantially above about 100 and typically in the range of 60–100 IV with a 60–70 IV preferred, when a shortening-like consistency is desired. Short times of hydrogenation are experienced here also substantially independent of the concentration of contaminants in the feed oil. Free fatty acids in the oil also tend to suppress hydrogenation as free fatty acid is refractory towards hydrogenation. The present process also proceeds substantially insensitively to the presence of free fatty acid.

When conducting the present invention as a two-stage process using the catalyst/adjunct catalyst combination as a primary stage to hydrogenate the oil to an intermediate IV, determination of the intermediate IV depends upon several factors, two of the more influential factors being contaminant concentration in the feed oil and initial IV of the feed oil. As to the latter factor, the intermediate IV should be at least about 10% lower than the initial IV of the oil fed to the primary hydrogenation zone. The 10% decrease in IV during primary hydrogenation is particularly applicable to feed oils having initial IV of around 10 to 30 or somewhat higher. For feed oils having initial IV of around 50–100 and especially for oils of around 100–200 IV, there is a rather wide range of intermediate Iodine Values which permit practical and rapid hydrogenation according to the present process. In these cases the intermediate IV can range from as low as 10–20 to about 80–100 and even as high as 130–160 depending upon the chosen feed oil. An intermediate IV of about 90–100 or thereabouts has been found to be advantageous and results in a much improved secondary hydrogenation stage using only a nickel catalyst.

Several other factors which effect the present process besides contaminants in the feed oil such as phosphatides, iron, free fatty acid and the like, include hydrogenation conditions such as temperature and hydrogen gas pressure; concentration of catalysts in each hydrogenation zone; efficiency and extent of catalyst contact with the hydrogen gas and oil, typically controlled by mixing or the like; mode of operation of the process, i.e. batch or continuous operation; and other factors known in the art. Adjustment and balance of these factors can be delicate at times, though proper design of the hydrogenation process can reduce the number of variables to but a few for ease of control and efficiency of the overall process. Precise details of operation of the present process are best determined and correlated for efficient and economic hydrogenation according to the present process.

Referring to primary hydrogenation, generally the adjunct catalyst is present in the zone in an amount of at least about 0.2 weight-percent based on the weight of the oil in the zone for maintaining speed and efficiency of the process. The adjunct catalyst can be present up to about 3 weight-percent or higher depending upon the concentration of contaminants in the feed oil. The nickel catalyst is present in the primary hydrogenation zone in an amount of greater than 0.02 weight-percent and this amount can range from about 0.025 to about 0.3 weight-percent or higher. At these higher levels of nickel catalyst, the present process proceeds quite effectively to the chosen intermediate IV level of the oil.

During secondary hydrogenation the concentration of nickel catalyst ranges from about 0.01 to about 0.30 weight-percent, advantageously between about 0.05 to about 0.20 weight-percent, and preferably between about 0.05 and about 0.15 weight-percent. Evidently, the adjunct catalyst in the primary hydrogenation step has sufficiently suppressed the effect of the contaminants that its need during secondary hydrogenation is eliminated or at least rendered unnecessary and costly.

The nickel hydrogenation catalyst can be in supported or unsupported from for primary and/or secondary hydrogenation. Typical support materials include alumina, silica gel, activated carbon and the like. The nickel catalyst can be made by thermally decomposing nickel formate or other heat-labile nickel salt in fatty oil at about 218°–233° C. or by precipitating a nickel salt on an inert carrier followed by reduction with hydrogen gas. The nickel catalyst also can be prepared by the treatment of electrolytically precipitated nickel hydroxide which may be prepared by passing direct current through a cell using nickel as the anode and using a dilute solution of an alkali salt of a weak acid as an electrolyte. The nickel hydroxide so prepared may be conventionally reduced, such as, in the presence of the hydrogen gas. The particular manner of preparing the nickel hydrogenating catalyst is not critical to the present invention as the present invention employs those nickel hydrogenation catalysts well known and used in the art today. For present purposes by nickel catalyst is meant the nickel metal content of such catalyst.

The copper chromite adjunct catalyst can be provided in unsupported form and can be stabilized with an alkaline earth metal oxide, such as manganese oxide, although this is not essential. Typically, the oxide stabilizing material ranges from about 4% to 8% by weight of the adjunct catalyst. The molar ratio of the copper to chromite components in the adjunct catalyst is not critical and such components can be in typical amounts as heretofore conventionally used in the hydrogenation art. Typically, the molar ratio of such components is about 1:1. While the nickel catalyst and the adjunct catalyst can be simultaneously deposited on an inert carrier or provided separately in admixture, it is only essential in the present invention that the catalyst and adjunct catalyst both be present in the primary hydrogenation zone during primary hydrogenation.

Though the catalyst-adjunct catalyst is a synergistic combination in the primary hydrogenation step, it is believed that certain dominant effects can be attributed to each individually in the present process.

The copper-chromite adjunct catalyst appears to act as a contaminant suppressant so that its concentration in the hydrogenation zone can be correlated and adjusted broadly proportional to the concentration of contaminants (mainly the phosphatides and free fatty acid) in the feed oil. The concentration of the adjunct catalyst, however, should be present in an amount of at least about 0.2 weight-percent based on the weight of the oil in the primary hydrogenation zone for maintaining the overall speed and efficiency of the hydrogenation process. Generally up to as high as about 3 weight-percent adjunct catalyst can be used for the process. Though higher proportions are permissible, higher costs must be reckoned with. The nickel catalyst, then, appears to act as the prime (though not sole) catalytic agent assisting in the hydrogen absorption by the oil. For overall speed and efficiency of the process, the nickel catalyst should be present at a weight proportion of greater than 0.02 weight-percent and this proportion generally can range from about 0.025 to about 0.3 weight-percent or higher during primary hydrogenation.

Typical sources of the oil are vegetable oil (including nut), animal fat, fish oil and the like. Vegetable oils include the oils of coconut, corn, cottonseed, linseed, olive, palm, palm kernel, peanut, safflower, soybean, sunflower, and like vegetable oils. For purposes of this invention an oil is a full ester of glycerol and fatty acid (triglyceride) which fatty acid has some unsaturation. Preferably the oil is edible.

The instant hydrogenation reduces the number of ethylenic linkages in the fatty acid chains to obtain even comparative low IV materials, and can be used to get practical saturation of such linkages. As practiced commercially, the hydrogenation of oils is a liquid phase process in which gaseous hydrogen is dispersed in the heated oil under the influence of a solid catalyst. Though continuous hydrogenation methods have been practiced, most present day commercial hydrogenation operations employ a batch process with particular hydrogention catalyst, which catalyst generally is separated from the product hydrogenated oil.

Hydrogenation operations for the instant invention comprise charging the unrefined oil into a hydrogenation reactor having a hydrogenation zone therein. Hydrogenation conditions for contacting hydrogen gas with the oil typically include temperatures of about 100° to about 300° C. and pressures of about 0 to about 100 psig. Typical hydrogenation reactors include the hydrogen recirculation type which consists of a cylindrical vessel provided with a hydrogen distributor at the bottom through which an excess quantity of hydrogen gas is blown through the oil in the hydrogenation zone. Another typical hydrogenation reaction is the dead-end system which employs a cylindrical pressure vessel with a mechanical agitator of the gas-dispersion type which is supplied from high pressure hydrogen gas storage tanks at the rate and in the volume actually used and leaked. A variety of other hydrogenation reactors are commercially employed and likewise beneficially hydrogenate the oil.

In the present process the total reaction is terminated when the Iodine Value of the product is determined to be within specifications for the particular product being made. The Iodine Value of the primary and secondary zones contents can be determined routinely by monitoring an indicia correlative to the Iodine Value of the contents, such as refractive index measurements, ultraviolet or infrared absorption techniques, and the like.

The present hydrogenation process can be performed quite advantageously on a continuous basis. Generally, the catalysts are separated from each other and the intermediate hydrogenated product from both catalysts by a variety of schemes. Typical schemes include holding one catalyst as a fixed bed in the hydrogenation zone while allowing the other catalyst to be freely dispersed in the oil, or providing one catalyst in supported form and the other catalyst in unsupported form for easy screening separation. Various schemes also include reuse of the nickel catalyst from the primary hydrogenation step for secondary hydrogenation while separating adjunct catalyst therefrom.

The following examples show in detail how the present invention can be practiced, but they should not be construed as limiting the scope of the present invention. In this specification all percentages and proportions are by weight, all temperatures in degrees Centigrade, and all mesh sizes in United States Standard Sieves Series, unless otherwise expressly indicated. Also, all catalyst weight-percentages herein are based on the weight in a zone of the oil subject to hydrogenation unless otherwise expressly indicated.

EXAMPLES

The feed oil used in the examples was from a lot of crude (unrefined) soybean oil which had the following analysis:

| Fatty Acid Content (chain length: no. of double bonds) | Weight-Percent |
|---|---|
| C12:0 | Trace |
| C14:0 | 0.1 |
| C16:0 | 10.8 |
| C16:1 | Trace |
| C18:0 | 3.9 |
| C18:1 | 23.3 |
| C18:2 | 53.3 |
| C18:3 | 8.2 |
| CALCULATED | IV = 133.8 |

| Fatty Acid Content (chain length: no. of double bonds) | Weight-Percent |
|---|---|
| Phosphatides | 1.6% |
| Free Fatty Acid (as oleic acid) | 0.41% |
| Iron | 8.8 ppm |
| Water | 0.29% |

Additional batches of this oil were modified or processed in order to reduce the level of contaminants therein to 0.9% and 0.2% phosphatides with a proportionate reduction of the other contaminants also resulting.

All hydrogenation runs were conducted in a two liter pressure vessel equipped with a variable speed stirred agitator and fitted with a pressure guage and electric heaters. The vessel was evacuated of air, the feed oil charged to the vessel, and heated to 100° C. prior to the reaction. All Iodine Values reported were measured chemically (Wijs method).

Hydrogenation conditions were as follows:

| | |
|---|---|
| Feed | 1300 grams of crude soybean oil |
| Temperatures | 220° C. |
| Pressure | 60 psi |
| Agitation | 600 rpm |

Samples of the oil were withdrawn periodically and the IV of the oil measured. The adjunct catalysts were copper chromite (about a 1:1 molar ratio of copper content to chromium content) stabilized with 4–8% of barium oxide (Code E-102 copper chromite catalyst supplied by Calsicat Division of Mallinckrodt, Inc.). The nickel catalysts were fully active nickel on a support and protected in a stearine (NYSEL HK-4 nickel catalyst supplied by Harshaw Chemical Company, NYSEL being a registered trademark). The proportion of nickel catalyst was held constant in the runs (0.4% nickel catalyst which provides 0.1% nickel metal), and the level of adjunct catalyst was varied as were the amounts of contaminants in the crude oil. The actual amount of nickel metal provided from the catalyst will be used herein.

EXAMPLE 1

The crude oil described above containing 1.6% phosphatides was hydrogened with the following catalysts:

| | |
|---|---|
| Run 1 | 0.1% nickel catalyst<br>1.0% copper chromite adjunct catalyst |
| Run 2 | 0.1% nickel catalyst (comparative run) |

The following results were obtained:

TABLE 1

| | HYDROGENATION TIME (hrs.) | | | | | |
|---|---|---|---|---|---|---|
| | 1 | 2 | 3 | 4 | 5 | 6 |
| Run No. 1 | | | | | | |
| I.V. | 126.3 | 109.9 | 91.9 | 77.5 | 66.6 | 58.1 |
| Run No. 2 | | | | | | |
| I.V. | 135.5 | 126.3 | 115.2 | 102.2 | 90.8 | — |

The above-tabled results show that a crude oil severaly contaminated with phosphatides and other contaminants can be hydrogenated at low hydrogen pressures using the catalyst system of the present invention. These results also show the ineffectiveness which nickel alone has for catalyzing the hydrogenation of crude oil.

The hydrogenated crude products obtained were analyzed with the following results obtained:

| FATTY ACID CONTENT | WEIGHT-PERCENT SAMPLE 1 | WEIGHT-PERCENT SAMPLE 2 |
|---|---|---|
| C14:0 | 0.2 | 0.1 |
| C16:0 | 10.7 | 10.8 |
| C18:0 | 25.4 | 7.3 |
| C18:1 | 59.8 | 59.6 |
| C18:2 | 3.7 | 21.0 |
| C18:3 | 0.0 | 0.7 |
| CALCULATED IV | 57.8 | 89.5 |

EXAMPLE 2

A sample of the modified crude oil containing about 0.9% phosphatides was hydrogenated with 0.1% nickel and 0.6% adjunct catalyst. The following results were obtained:

TABLE 2

| | HYDROGENATION TIME (hrs.) | | | |
|---|---|---|---|---|
| | 1 | 2 | 3 | 4 |
| I.V. | 76.8 | 28.8 | 6.0 | 1.9 |

Here, a moderate proportion of adjunct catalyst permitted a rapid hydrogenation of the crude oil in very rapid fashion. The level of phosphatides in the oil used in this run is an advantageous amount which is easily obtainable by degumming the oil and which exerts little depressant effect on the instant process.

EXAMPLE 3

Samples of the crude oil modified to contain about 0.2% phosphatides were hydrogenated with the following catalysts.

| | |
|---|---|
| Run 1 | 0.1% nickel<br>0.2% copper chromite |
| Run 2 | 0.1% nickel<br>1.0% copper chromite |

The following results were obtained:

TABLE 3

| | HYDROGENATION TIME (hrs.) | | | |
|---|---|---|---|---|
| | 1 | 2 | 3 | 4 |
| SAMPLE 1 IV | 16.0 | 1.0 | — | — |
| SAMPLE 2 IV | 44.7 | 11.0 | 3.5 | 1.2 |

Again, the speed and efficiency of the present process is demonstrated. The final hydrogenated products were analyzed and the following results were obtained.

| FATTY ACID CONTENT | SAMPLE 1 wt-% | SAMPLE 2 wt-% |
|---|---|---|
| C14:0 | 0.1 | 0.1 |
| C16:0 | 10.6 | 10.6 |
| C18:0 | 88.7 | 88.7 |
| C18:1 | 0 | 0 |
| C18:2 | 0 | 0 |
| C18:3 | 0 | 0 |
| CALCULATED IV | 0.0 | 0.0 |

EXAMPLE 4

The crude oil containing 1.6% phosphatides was hydrogenated in a 2-stage process. The first stage in each run was conducted substantially as described in Example 1 using 0.1% nickel and 1.0% copper chromite. The primary stage was terminated after 3 hours at which time the oil had an IV of 88.8. The catalysts were filtered from the oil and fresh catalyst was added. The same hydrogenation conditions were used for the secondary hydrogenation stage with the following catalysts.

| | |
|---|---|
| Run 1 | 0.1% nickel<br>1.0% copper chromite |
| Run 2 | 0.1% nickel |

The following results were obtained for the secondary hydrogenation stage:

TABLE 4

| | HYDROGENATION TIME (hrs.) | | | |
|---|---|---|---|---|
| | 1 | 2 | 3 | 4 |
| Run No. 1 I.V. | 60.2 | 48.7 | 39.0 | 35.5 |
| Run No. 2 I.V. | 10.9 | 2.1 | — | — |

These results show that the use of the nickel catalyst/copper chromite adjunct catalyst system in the secondary stage was not as effective as use of only nickel hydrogenation catalyst in the secondary hydrogenation stage. Thus, the use of this two-stage process permits the hydrogenation of a severely contaminated crude oi to produce a substantially fully hydrogenated product in rapid fashion.

Perfunctory testing of the hydrogenated crude oils of this invention indicated that conventional bleaching (such as with bleaching earths and clays), at perhaps higher levels of bleaching agent, and conventional deodorization could provide an acceptable edible oil free of objectionable odor and light in color. Phosphoric acid or like conventional agents proved helpful also in purifying the oil. Thus, use of the present invention may obviate conventional alkali refining of the hydrogenated crude oil.

I claim:

1. A process for the hydrogenation of a crude glyceride oil which comprises:

subjecting said oil to hydrogenation in a hydrogenation zone with hydrogen gas under hydrogenation conditions in the presence of greater than 0.02 weight percent nickel hydrogenation catalyst and of greater than about 0.2 weight percent copper chromite adjunct catalyst, said catalyst weight percent based on the weight of said oil, the concentration of said adjunct catalyst being established and maintained broadly proportional to the concentration of contaminants in said crude oil; and discontinuing said hydrogenation after at least a significant increase in saturation of said oil has occurred.

2. The process of claim 1 wherein the concentration contaminant phosphatide is less than about 2.0 weight percent by weight of said crude oil and said hydrogenation is discontinued when the resulting hydrogenated product has an Iodine Value at least as low as about 100.

3. The process of claim 1 wherein said crude oil is a degummed crude oil.

4. The process of claim 3 wherein said crude oil has been degummed to contain less than about 1% contaminant phosphatide by weight of said oil.

5. The process of claim 2 wherein said nickel hydrogenation catalyst is present from about 0.025 to about 0.3 weight-percent and said adjunct catalyst is present from about 0.2 to about 3 weight-percent.

6. The process of claim 5 wherein said adjunct catalyst is present from about 1 to about 3 weight-percent.

7. The process of claim 2 wherein said resulting hydrogenated product has an Iodine Value (IV) of between about 60 and about 100.

8. The process of claim 7 wherein said resulting hydrogenated product has an Iodine Value (IV) of between about 60 and about 70.

9. The process of claim 2 wherein the resulting hydrogenated product has an Iodine Value (IV) of not substantially above about 30.

10. The process of claim 2 wherein said adjunct catalyst is stabilized with a metal oxide.

11. The process of claim 10 wherein said metal oxide is barium oxide.

12. The process of claim 10 wherein said metal oxide is manganese oxide.

13. The process of claim 2 wherein said feed oil is admitted continuously into an inlet of said hydrogenation zone and the resulting hydrogenated product is withdrawn continuously from an outlet of said hydrogenation zone.

14. The process of claim 13 wherein an indicia correlative to the Iodine Value (IV) of the oil near said outlet is monitored continuously during said hydrogenation, and at least one adjustable hydrogenation condition of said zone is adjusted in response to variation of said indicia and to a degree adequate for maintaining said indicia, thus the corresponding Iodine Value (IV) of the product, substantially constant.

15. The process of claim 1 wherein said hydrogenation is primary hydrogenation which is discontinued at an intermediate Iodine Value of the oil of at least about 10% less than the Iodine Value of the crude oil fed to the process;

at least said adjunct catalyst is separated from said oil;

said intermediate Iodine Value oil is subjected to secondary hydrogenation in a secondary hydrogenation zone with hydrogen gas under hydrogenation conditions in the presence of about 0.01 to 0.03 weight percent nickel-hydrogenation catalyst based on the weight of oil in said secondary zone;

said secondary hydrogenation being discontinued when the Iodine Value of the oil in said secondary zone is less than said intermediate Iodine Value and not substantially above about 30; and said resulting hydrogenation product is withdrawn from said secondary hydrogenation zone.

16. The process of claim 15 wherein for primary hydrogenation the proportion of nickel catalyst ranges from about 0.025 to about 0.3 weight percent and said adjunct catalyst ranges from about 0.25 to about 3 weight percent.

17. The process of claim 16 wherein said adjunct catalyst ranges from about 1 to about 3 weight percent.

18. The process of claim 15 wherein said adjunct catalyst is metal oxide stabilized.

19. The process of claim 18 wherein said metal oxide is barium oxide or manganese oxide.

20. The process of claim 15 wherein said oil is admitted continuously into said primary hydrogenation zone and said resulting hydrogenated product is continuously withdrawn from said secondary hydrogenation zone.

21. The process of claim 20 wherein the Iodine Value of the oil in at least one of said hydrogenation zones is monitored continuously near an outlet in at least one of said zones and at least one adjustable hydrogenation condition of said monitored zone is adjusted in response to variation of said indicia and to a degree adequate for maintaining said indicia, thus the corresponding Iodine Value (IV) of the contents of said monitored zone, substantially constant.

22. The process of claim 15 wherein for secondary hydrogenation said nickel catalyst ranges from about 0.10 to about 0.3 weight percent.

23. The process of claim 22 wherein said nickel catalyst ranges from about 0.10 to about 0.20 weight percent.

24. The process of claim 15 wherein said withdrawn resulting hydrogenated product has IV not substantially above about 20.

25. The process of claim 24 wherein said IV is not substantially above about 10.

26. The process of claim 25 wherein said IV is between about 0 and about 5.

27. The process of claim 15 wherein said primary hydrogenation zone and secondary hydrogenation zone are the same zone.

28. A process for the hydrogenation of a crude glyceride oil wherein the resulting hydrogenated product has an Iodine Value (IV) not substantially above about 30, comprising:

subjecting said crude oil to primary hydrogenation in a primary hydrogenation zone with hydrogen gas under hydrogenation conditions in the presence of between about 0.025 and about 0.3 weight percent nickel hydrogenation catalyst and of between about 0.25 and about 3 weight percent copper chromite adjunct catalyst, said catalyst weight percentages based on the weight of said oil in said primary zone;

establishing and maintaining the concentration of said adjunct catalyst in said zone broadly proportional to the concentration of contaminants in said oil as measured by the proportion of contaminant phosphatide in said oil;

discontinuing said primary hydrogenation at an intermediate Iodine Value (IV) of the oil in said primary zone of between about 10 and about 120;

separating at least said ajunct catalyst from said oil;

subjecting said primary hydrogenated oil to secondary hydrogentaion in a secondary hydrogenation zone with hydrogen gas under hydrogenation conditions in the presence of about 0.01 to about 0.3 weight percent nickel hydrogenation catalyst based on the weight of said oil in said secondary zone;

discontinuing said secondary hydrogenation when the Iodine Value (IV) of said oil in said secondary zone is less than said intermediate Iodine Value (IV) and not substantially above about 30; and withdrawing said resulting hydrogenated product from said secondary hydrogenation zone.

29. The process of claim 28 wherein the proportion of contaminant phosphatide is not greater than about 2.0 weight percent.

30. The process of claim 29 wherein the proportion of contaminant phosphatide is not greater than about 1.0 weight percent.

* * * * *